United States Patent
Oh et al.

(10) Patent No.: US 6,714,619 B2
(45) Date of Patent: Mar. 30, 2004

(54) SPACER GRID WITH DOUBLE DEFLECTED VANES FOR NUCLEAR FUEL ASSEMBLIES

(75) Inventors: Dongseok Oh, Daejeon-si (KR); Taehyun Chun, Daejeon-si (KR); Wangkee In, Daejeon-si (KR); Keenam Song, Daejeon-si (KR); Hyungkyu Kim, Daejeon-si (KR); Heungseok Kang, Daejeon-si (KR); Kyungho Yoon, Daejeon-si (KR); Younho Jung, Daejeon-si (KR)

(73) Assignees: Korea Atomic Energy Research Institute, Daejeon-si (KR); Korea Kydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/215,996

(22) Filed: Aug. 7, 2002

(65) Prior Publication Data

US 2004/0005025 A1 Jan. 8, 2004

(30) Foreign Application Priority Data

Aug. 7, 2001 (KR) .................................. 2001-47442

(51) Int. Cl.⁷ ................................................. G21C 3/34
(52) U.S. Cl. ......................... 376/439; 376/438; 376/442
(58) Field of Search .................... 326/439, 438, 326/442

(56) References Cited

U.S. PATENT DOCUMENTS

| | | | |
|---|---|---|---|
| 4,089,741 A | | 5/1978 | Patterson et al. |
| 4,692,302 A | * | 9/1987 | DeMario et al. ............ 376/439 |
| 5,188,797 A | * | 2/1993 | Bryan ........................ 376/438 |
| 5,299,245 A | | 3/1994 | Aldrich et al. |
| 5,303,276 A | * | 4/1994 | DeMario et al. ............ 376/442 |
| 5,307,393 A | * | 4/1994 | Hatfield ...................... 376/442 |
| 5,402,457 A | * | 3/1995 | Suchy et al. ................ 376/443 |
| 5,440,599 A | | 8/1995 | Rodack et al. |
| 6,236,702 B1 | | 5/2001 | Chun et al. |
| 6,278,758 B1 | * | 8/2001 | Imaizumi et al. ........... 376/438 |
| 6,393,087 B1 | * | 5/2002 | Oh et al. ..................... 376/439 |

FOREIGN PATENT DOCUMENTS

DE  1 439 463  *  4/1969

* cited by examiner

Primary Examiner—Michael J. Carone
Assistant Examiner—R Palabrica
(74) Attorney, Agent, or Firm—Bachman & LaPointe, P.C.

(57) ABSTRACT

A spacer grid for use in a nuclear fuel assembly has double-deflected vanes that guide an axial flow of coolant around fuel rods and thereby generate swirl flow. The vanes each have a double bend projecting upwardly from first inner straps and projecting toward one fuel rod. The vanes are sufficiently wide at their bases to prevent inadvertent deformation due to contact with fuel rods during an insertion of fuel rods into the cells. The vanes also make a smooth variation in the cross-sectional area of the coolant channel at the outlet of the spacer grid, thus reducing a loss of pressure during reactor operation.

6 Claims, 9 Drawing Sheets

Contemporary Art

Contemporary art

SPACER GRID WITH DOUBLE DEFLECTED VANES FOR NUCLEAR FUEL ASSEMBLIES

BACKGROUND OF THE INVENTION

1. Field of the Invention

The present invention relates, in general, to spacer grids used for supporting a plurality of fuel rods in a nuclear fuel assembly and forming a strong turbulent flow of coolant in the assembly and, more particularly, to a spacer grid having double deflected vanes, integrally formed into an upper portion thereof for bending the axial flow of coolant into a swirl flow around the fuel rods placed in square cells, thus more effectively cooling the fuel rods. The vanes are sufficiently wide at their base portions so as to prevent an unexpected bending thereof due to their contact with fuel rods during an insertion of fuel rods into the cells, the vanes also making a smooth variation in the cross-sectional area of the coolant channel at the outlet of the spacer grid, thus preferably reducing pressure loss during an operation of the reactor.

2. Description of the Prior Art

As shown in FIG. 8, a conventional nuclear fuel assembly of a nuclear reactor comprises a plurality of fuel rods 200, each fabricated such that a fissionable fuel material, such as a uranium core, is contained in a hermetically sealed, elongated zircaloy tube, known as the cladding. The fuel rods 200 are placed and supported within the fuel assembly by a plurality of spacer grids 700, which also form a strong turbulent flow of coolant within the fuel assembly. The bottom end plate 300 and top end plate 400 stably connect the fuel rods with the lower and upper structure of the reactor core, respectively.

In the fuel assembly, the spacer grids 700 and the end plates 300 and 400 are integrated into a single structure using a plurality of guide tubes 500. The guide tubes 500 also form a plurality of passages for receiving a variety of monitoring tubes used for measuring the operational conditions of the reactor.

As shown in FIG. 9, each of the spacer grids 700 are produced by interlacing a plurality of thin metal inner straps at right angles to form an egg-crate pattern, and welding the interlaced straps at their intersections prior to encircling the periphery of the grid with four perimeter straps. A plurality of mixing vanes are provided on the upper portion of each spacer grid 700 for bending the axial flow of coolant to a transverse flow. The spacer grid 700, fabricated by the interlaced inner straps, defines a plurality of four-walled cells for receiving and holding the fuel rods 200 therein, as shown in FIG. 10. In each of the cells, a plurality of grid springs and a plurality of strong dimples are formed on the inner straps such that the springs and dimples face each other. The springs and dimples support the fuel rods 200 in the spacer grids 700.

In the fuel assembly, the fuel rods 200 are axially set in the cells of the spacer grids 700 such that four fuel rods 200 inside four adjacent cells of each spacer grid form a coolant channel, causing the coolant to flow axially, i.e., along the channel. However, the fuel rods of a nuclear fuel assembly typically have different thermal outputs due to an imbalance in the neutron flux distribution, and so the coolant flowing through some coolant channels surrounded by fuel rods having high thermal outputs is highly increased in the temperature in comparison with the coolant flowing through other coolant channels surrounded by fuel rods having low thermal outputs. The thermal outputs of the fuel rods positioned around the high temperature channels are also increased, and so the coolant flowing in said channels is boiled prior to the coolant flowing in the low temperature channels, and forms bubbles on the external surfaces of the fuel rods. Such bubbles are joined together as time goes by, thus forming a bubble layer on the external surface of each fuel rod. The bubble layers prevent heat from transferring from the fuel rods to the coolant, and so the heat transfer condition of the fuel rods may reach so called a critical heat flux condition which increases the temperature of the fuel rods and overheats the fuel rods.

Such an excessive increase in the temperature of the fuel rods causes partial thermal stress on the claddings of the fuel rods, thus reducing the mechanical performance of the fuel rods. When the temperature of the fuel rods is further increased, the temperatures of the core and cladding of each fuel rod may reach their melting points.

The mixing vanes, provided on the upper portion of each spacer grid, bend the axial flow of coolant to a cross flow or a swirl flow by the shapes. The transverse flow of coolant formed by the mixing vanes during the redirection of the axial coolant flow to the cross flow or the swirl flow somewhat relieves the imbalance in the temperature distribution between the coolant channels. In such a case, the increased turbulent flow energy of coolant disturbs the thermal boundary layers of coolant on the external surfaces of the fuel rods, and detaches the bubbles formed on the external surfaces of the fuel rods, thus promoting the heat transfer efficiency on the external surfaces of the fuel rods.

The operation of nuclear reactors has been controlled such that no critical heat flux is generated in the coolant channels of the nuclear fuel assemblies. In order to allow a nuclear fuel assembly to generate power at high output without forming any critical heat flux, the fuel assembly may be controlled such that it has a uniform coolant temperature distribution and prevents the fuel rods from overheating partially.

As described above, the objective of the mixing vanes of the spacer grids is to improve the thermal mixing effect of coolant and thereby improve the thermal efficiency of a fuel assembly. However, the mixing vanes may be undesirably bent or deformed when they are unexpectedly impacted by the fuel rods during an insertion of the fuel rods into a fuel assembly. Such bent or deformed mixing vanes scratch and damage the fuel rod surface due to the contact with the fuel rods during an insertion of the fuel rods into the cells. The mixing vanes also sometimes increase the pressure loss in the spacer grids, and thereby increase the mechanical energy in a nuclear reactor system.

Representative examples of conventional mixing vanes of the spacer grids for nuclear fuel assemblies are described in U.S. Pat. Nos. 4,692,302, 5,299,245, and 5,440,599.

In U.S. Pat. No. 4,692,302 (Inventors: Edmund E. Demario et al., Applicant: Westinghouse Co. Ltd.), two mixing vanes are formed either side of intersection of the inner straps of a spacer grid, such that the two vanes are oriented in opposite directions and guide the axial flow of coolant along the central axis of each coolant channel to the gaps between fuel rods. However, the spacer grid having such mixing vanes is apt to causes a large hydraulic pressure loss while bending the high speed axial flow of coolant along the central axis of each coolant channel to a cross flow.

In U.S. Pat. No. 5,440,599 (Inventors: Thomas Rodack et al., Applicant: Combustion Engineering Co. Ltd.), a mixing vane is positioned at a triangular support provided at the center of each coolant channel. The mixing vane is deflected such that it guides the axial flow of coolant from the center of the coolant channel to the gaps between the fuel rods. However, this mixing vane prone to reduce the cooling efficiency by the reason that the transverse flow of coolant formed by the mixing vanes comes into collision with the axial flow of coolant along the central axis of the coolant channel, thus being disturbed by the axial flow.

In U.S. Pat. No. 5,299,245 (Inventors: Michael E. Aldrich et al., Applicant: B&W Fuel Co. Ltd.), four mixing vanes are formed within each coolant channel at the inner straps around a welded tap provided on either side of intersection of the inner straps. The mixing vanes guide the axial flow of coolant from the center of the coolant channel to the gaps between the fuel rods. However, the spacer grid having such mixing vanes is liable to increase pressure loss by the reason that the four mixing vanes within each coolant channel reduce the opening ratio of the coolant channel in comparison with the other conventional spacer grid having two mixing vanes within each coolant channel.

SUMMARY OF THE INVENTION

Accordingly, the present invention has been made keeping in mind the above problems occurring in the conventional art.

It is an objective of the present invention to provide a spacer grid for nuclear fuel assemblies, which is integrated with double deflected vanes at its upper portion for bending the axial flow of coolant into a swirl flow around the fuel rods in the fuel assembly, thus improving the coolant mixing efficiency and more effectively cooling the fuel rods, the vanes of which are also sufficiently wide at their base portions as to prevent an unexpected bending thereof due to their contact with fuel rods during an insertion of the fuel rods into the cells, thus improving the mechanical properties of the spacer grid; and the vanes of which also make a smooth variation in the cross-sectional area of the coolant channel at the outlet of the spacer grid, thus preferably reducing pressure loss at upper portion of spacer grid and thereby improving the hydraulic efficiency of the spacer grid during an operation of the fuel assembly.

In order to accomplish the above objectives, the present invention provides an improvement over the prior art wherein a spacer grid for use in a nuclear fuel assembly has double-deflected vanes that guide an axial flow of coolant around fuel rods and thereby generate swirl flow. The vanes each have a double bend projecting upwardly from first inner straps and projecting toward one fuel rod. The vanes are sufficiently wide at their bases to prevent inadvertent deformation due to contact with fuel rods during an insertion of fuel rods into the cells. The vanes also make a smooth variation in the cross-sectional area of the coolant channel at the outlet of the spacer grid, thus reducing a loss of pressure during reactor operation.

BRIEF DESCRIPTION OF THE DRAWINGS

The above and other objectives, features and advantages of the present invention will be more clearly understood from the following detailed description taken in conjunction with the accompanying drawings, in which.

DESCRIPTION OF THE PREFERRED EMBODIMENTS

Figure 1:
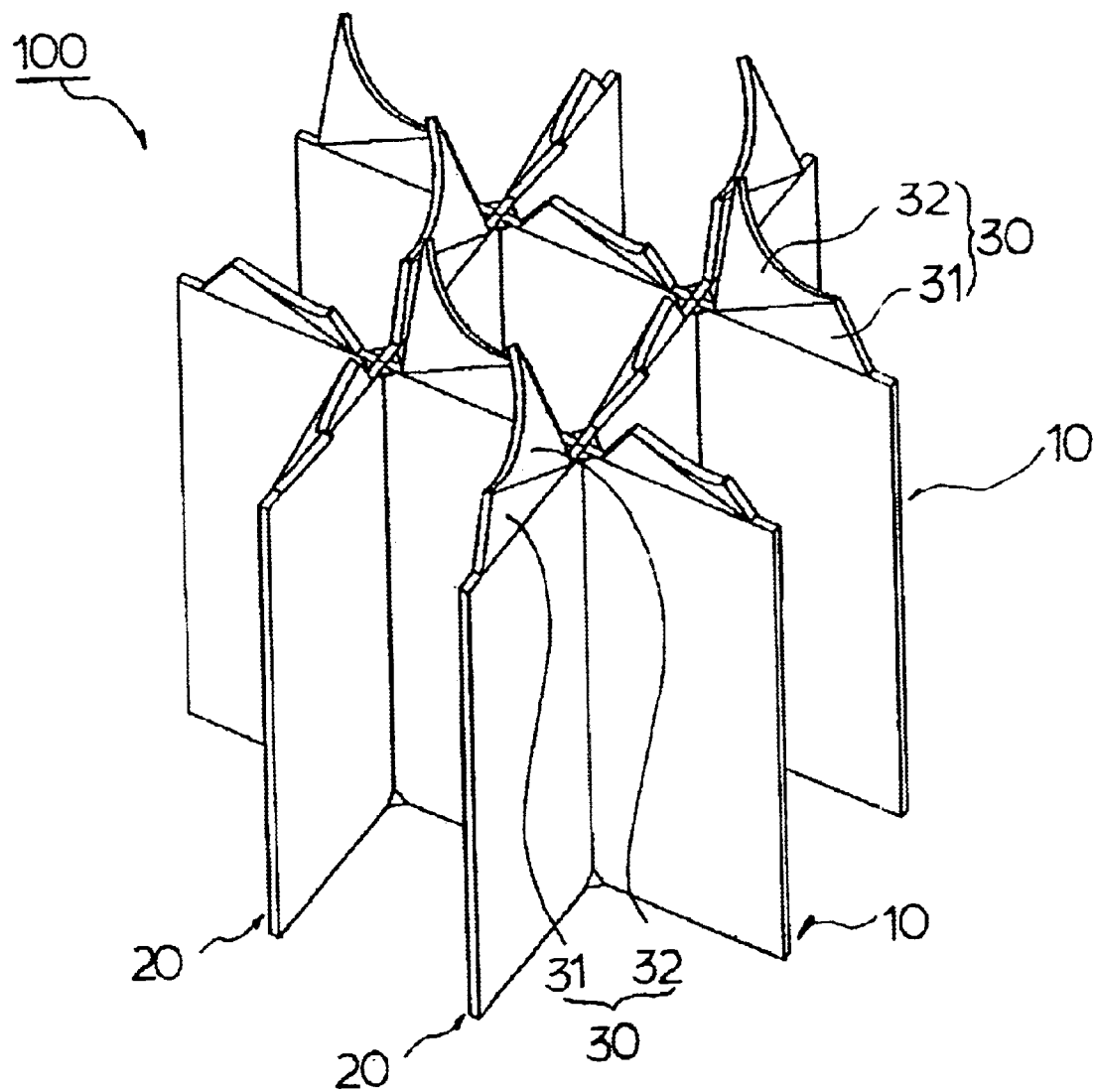
FIG. 1 is a perspective view, showing the construction of a spacer grid for nuclear fuel assemblies in accordance with the preferred embodiment of the present invention.
Figure 2:
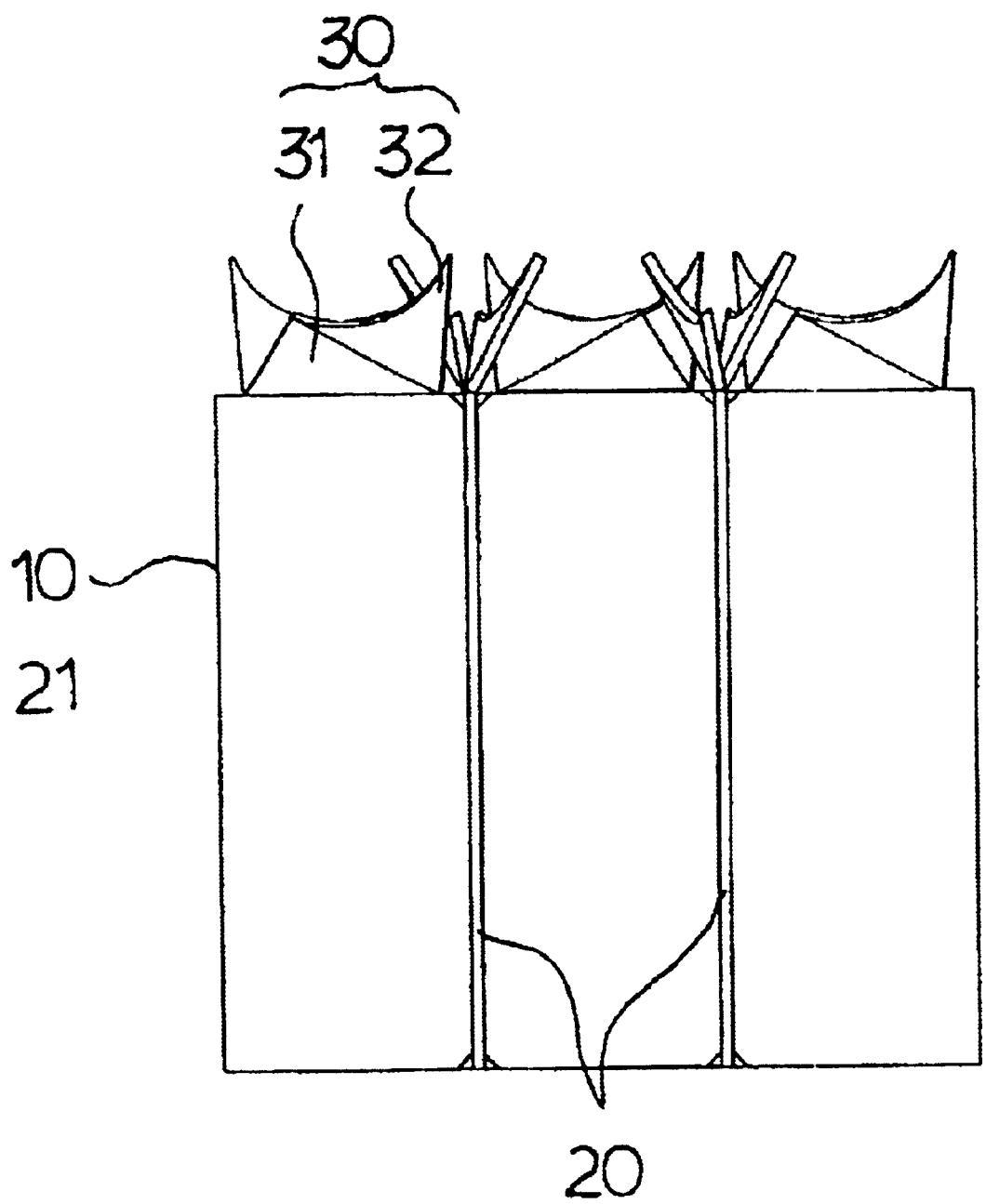
FIG. 2 is a front view of the spacer grid according to this invention.

As shown in these drawings, the spacer grid 100 used for supporting fuel rods within a nuclear fuel assembly in accordance with the present invention is fabricated by interlacing a plurality of first and second inner straps 10 and 20 at right angles at the slits 12 and 22, thus forming a desired spacer grid 100 having an egg-crate pattern. The interlaced first and second inner straps 10 and 20 are welded together at the top and bottom of each interlaced cross point, thus being integrated into a single structure.

Each of the first and second inner straps 10 and 20 is integrated at their upper edge with a plurality of double deflected vanes 30. Each of the double deflected vanes 30 comprises a swirl flow inducing vane 31 integrally extending upward from the upper edge of an associated inner strap, while being deflected toward fuel rod, and a main vane 32 formed by bending the middle of the double deflected vane along the predetermined inclined bending line.

Figure 6:
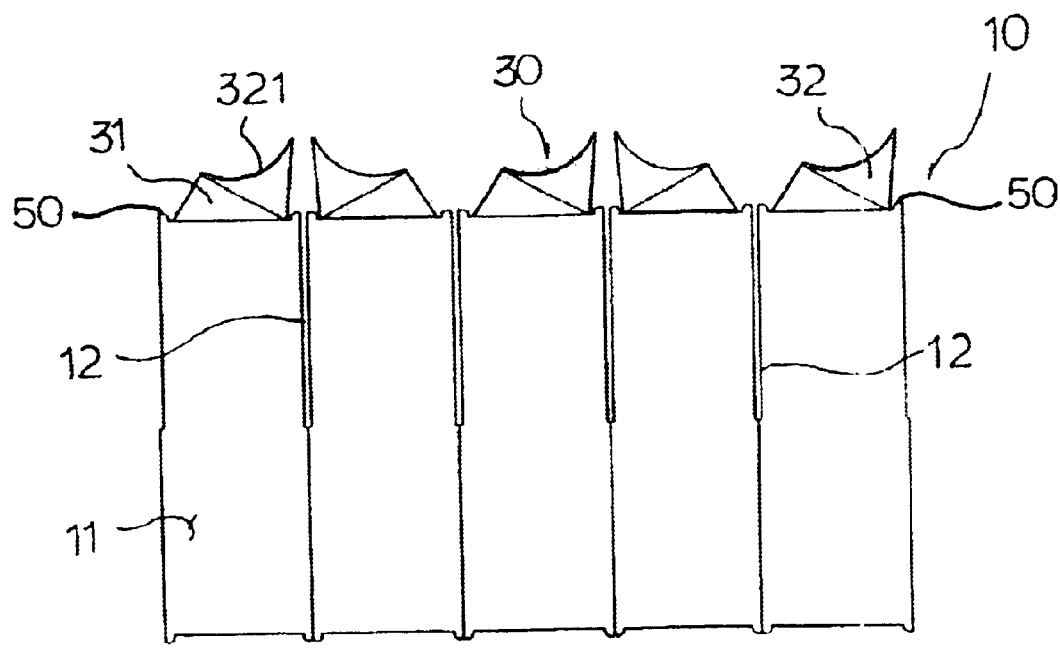
FIG. 6 is a plan view of a first inner strap of the spacer grid according to this invention.
Figure 7:
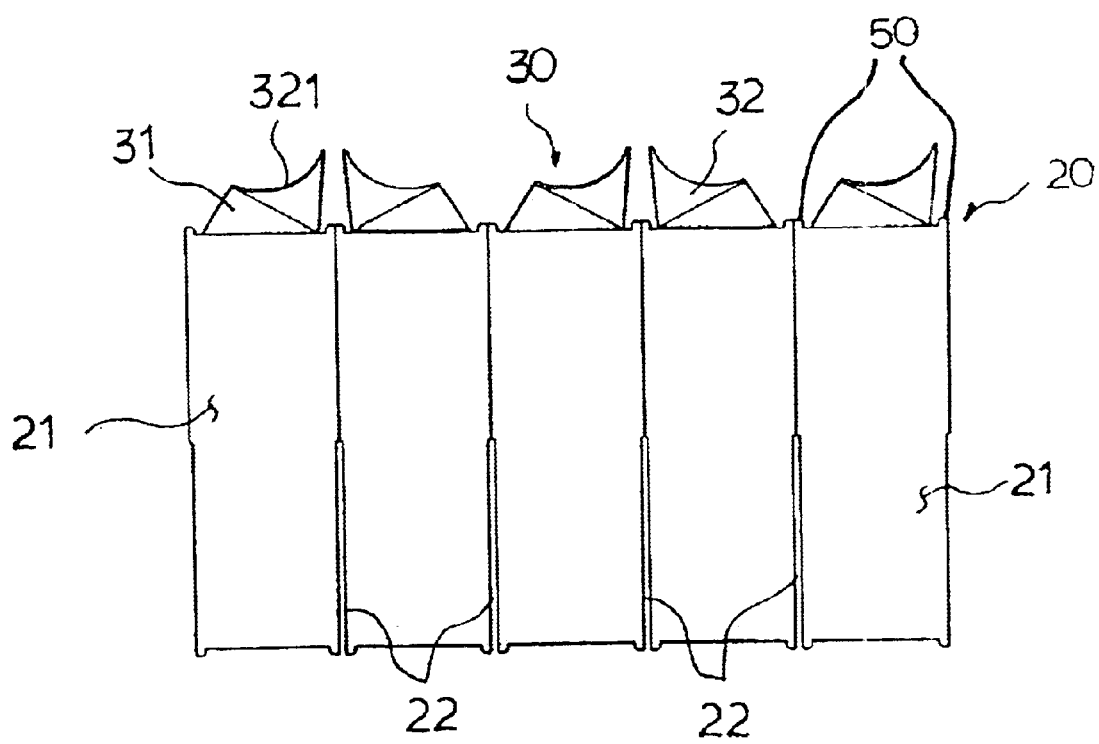
FIG. 7 is a plan view of a second inner strap of the spacer grid according to this invention.
Figure 8:
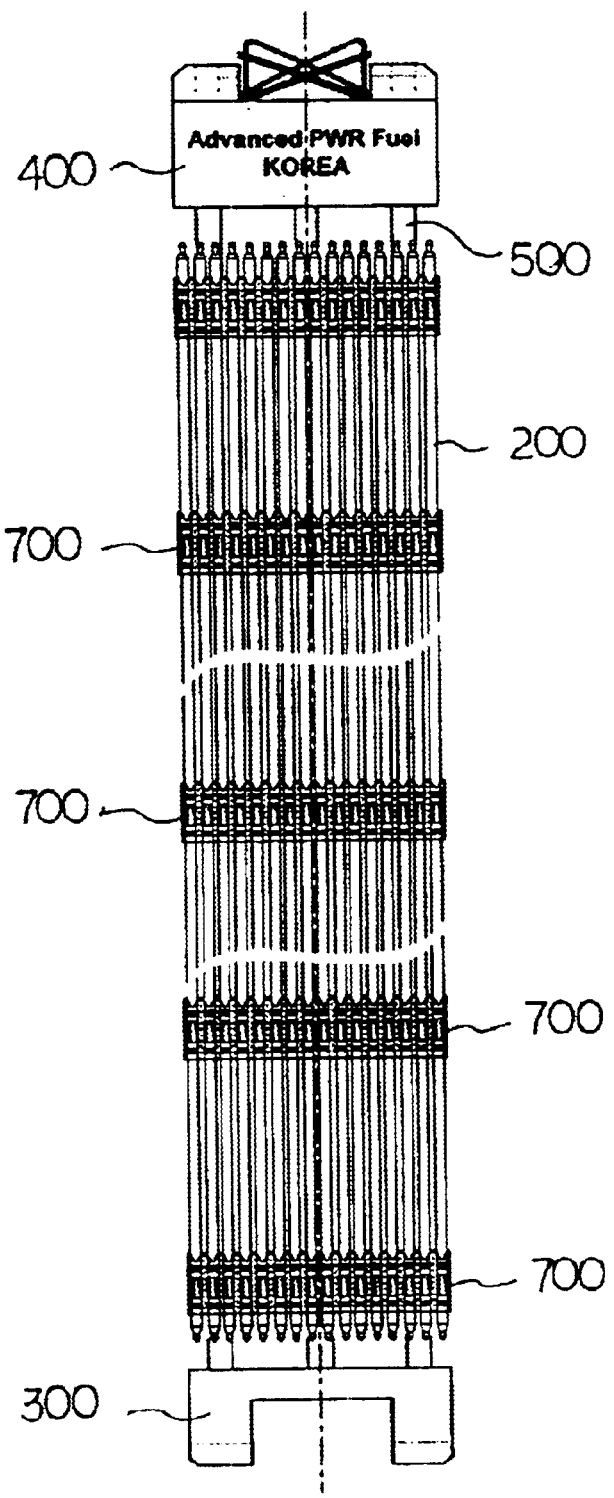
FIG. 8 is a view of a conventional nuclear fuel assembly.
Figure 9:
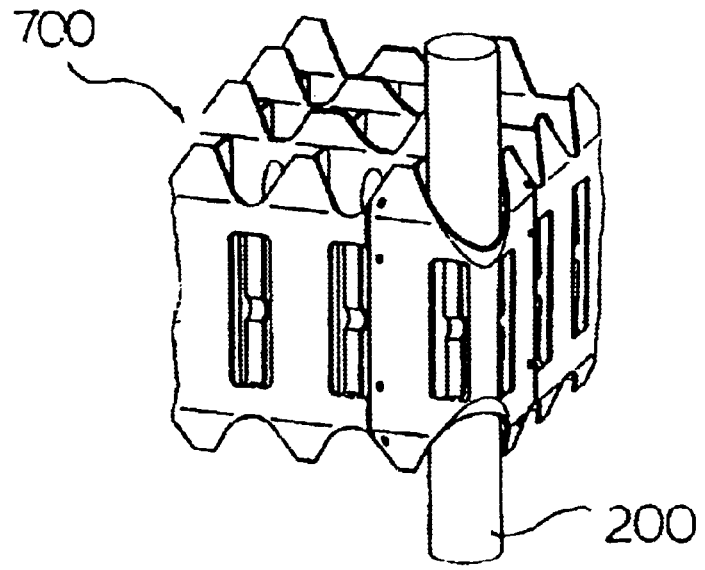
FIG. 9 is a perspective view of a part of a conventional spacer grid for nuclear fuel assemblies.
Figure 10:
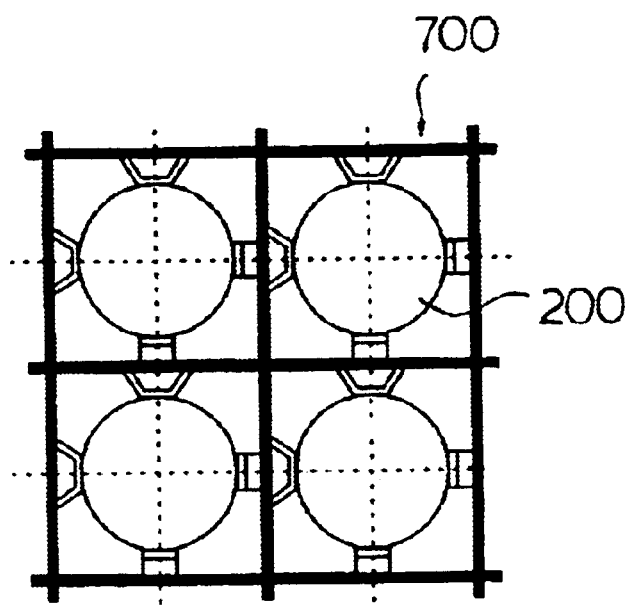
FIG. 10 is a plan view of four cells of the conventional spacer grid, with a fuel rod set within each of the cells.
Figure 11:
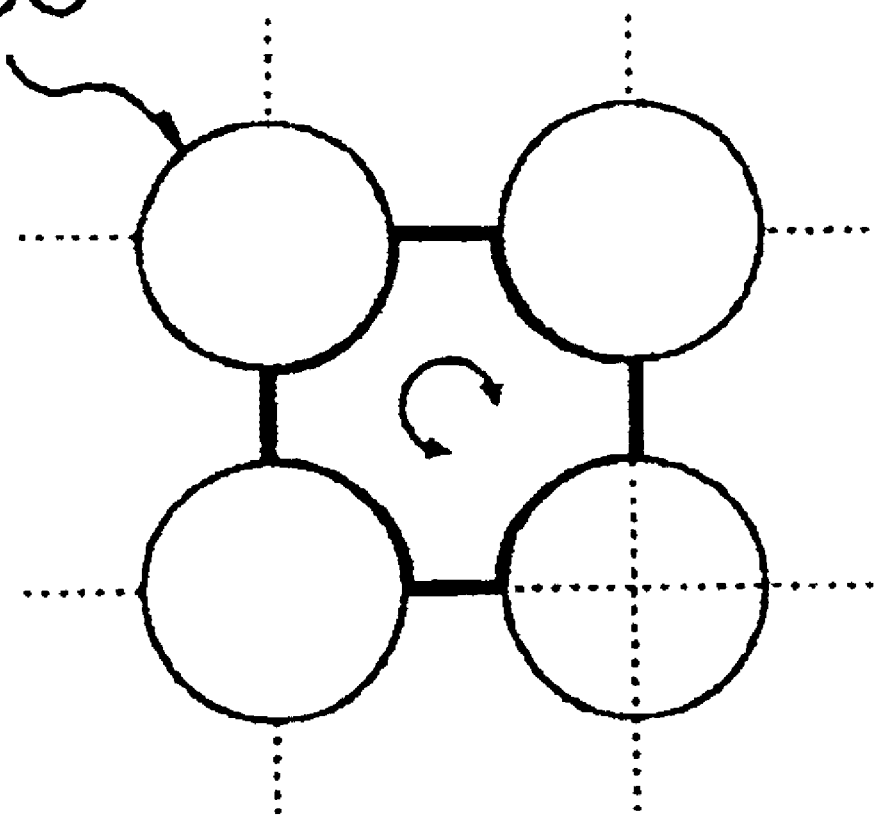
FIG. 11 is a plan view of a coolant channel defined within a spacer grid by four fuel rods.

As shown in FIGS. 6 and 7, the first and second inner straps 10 and 20 of the spacer grid 100 each has a rectangular body 11 or 21, which has a thin, straight cross-section. Each of the first and second inner straps 10 and 20 also has a plurality of vertical slits 12 or 22, which extend from the upper or lower edge of an associated inner strap to its middle, while being regularly spaced apart from each other.

A pair of welding tabs 50 is formed on the edge of each inner strap 10 or 20 at the sides of each vertical slit 12 or 22, and melts during an intersection welding process to form welding nuggets. In each of the inner straps 10 and 20, the slits 12 or 22 are spaced at an interval equal to the pitch of the fuel rods.

Figure 5:
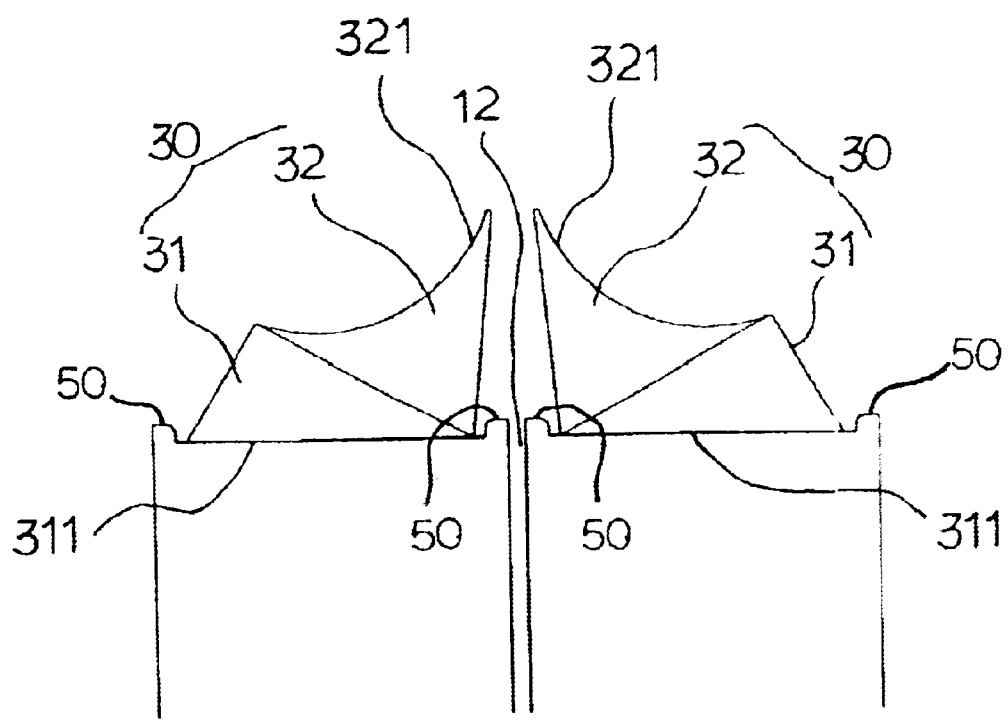
FIG. 5 is a front view of an inner strap with straight vanes before the vanes are deflected to form double deflected vanes of this invention.

As shown in FIG. 5, The double deflected vanes 30 are integrated with the upper edge of each of the first and second inner straps 10 and 20 and are formed either side of the vertical slits 12 and 22, such that a pair of vanes 30 around each of the slits 12 and 22 are rotationally symmetrical with each other.

The double deflected vanes 30 each comprise a swirl flow inducing vane 31 and a main vane 32. The swirl flow inducing vane 31 is integrated with the upper edge of an associated strap 10 or 20, and is deflected in a direction toward an associated fuel rod 200.

The main vane 32 is formed by bending the middle of the double deflected vane along the predetermined inclined bending line. Each of the vanes 30 is thus deflected twice to have double deflection angles.

The swirl flow inducing vane 31 is an asymmetric triangular shape which has an inclined upper edge, an inclined bending line and a base portion 311 and is deflected toward an associated fuel rod 200 at a predetermined acute angle relative to the plane of an associated inner strap 10 or 20, as best seen in FIG. 5. The swirl flow inducing vane 31 simultaneously generates negative pressure at the back of the vane and high pressure at the front of the vane. This high and low pressure distribution makes it easy to cause axial flow of the coolant to lateral flow of coolant, guides the axial coolant flow to the main vane, and increases the total swirl flow of coolant inside the spacer grid.

The width of base portion 311 of the swirl flow inducing vane 31 is substantially equal to the distance between the welding nuggets formed at each intersection of the inner straps 10 and 20.

The base portion 311 is increased in its length in comparison with that of a conventional spacer grid, and so it is possible to prevent an unexpected bending of the vanes due to the contact of the vanes with fuel rods during an insertion of the fuel rods into a cell opening.

The vane has a polygonal shape with a wide base portion and a narrow top portion, to make a smooth variation of cross sectional of the coolant passage at upper part of strap, thereby reducing the pressure loss of the coolant flow through the spacer grid upper portion and improving hydraulic performance of the spacer grid.

The main vane 32, which is formed by bending the middle of the double deflected vane along the predetermined inclined bending line, is deflected in the direction toward an associated fuel rod 200 relative to the plane of the swirl flow inducing vane 31 and has a curved edge 321 which is shaped to surround the associated fuel rod 200 and preferably maintains a constant distance from the surface of the fuel rod 200, as shown in FIGS. 5 and 7, is to generate a swirl flow of coolant in the fuel assembly.

Figure 3:
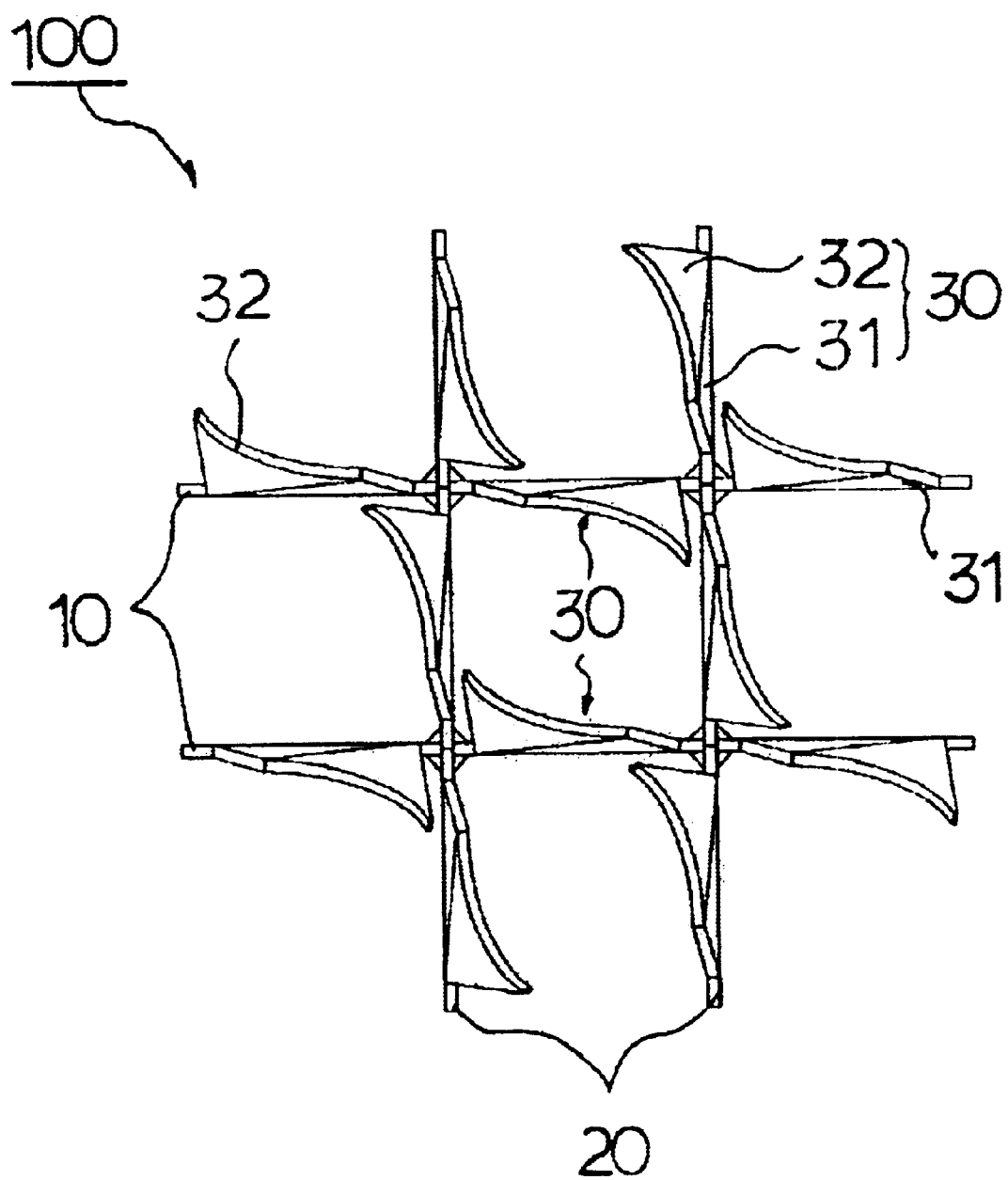
FIG. 3 is a plan view of the spacer grid according to this invention.
Figure 4:
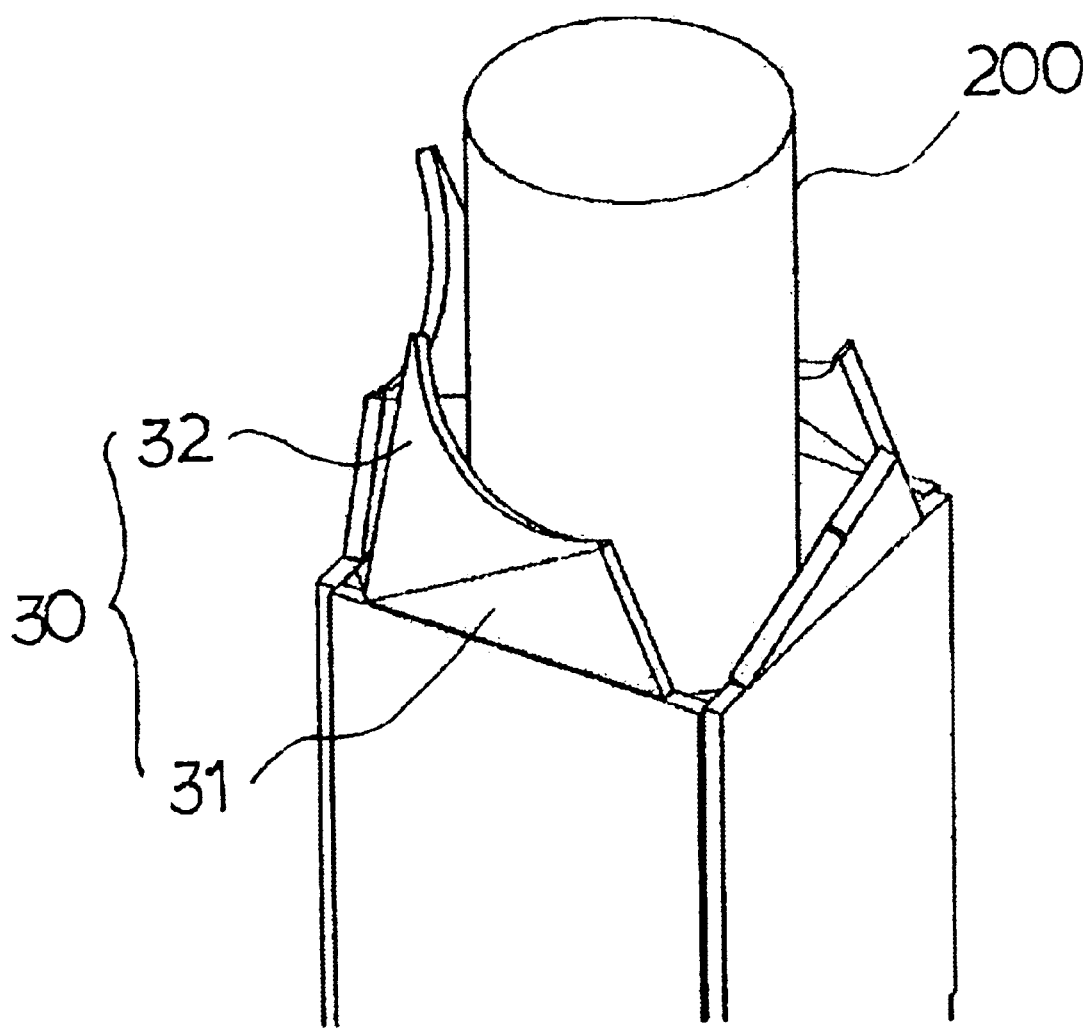
FIG. 4 is a perspective view of the spacer grid according to this invention, with one fuel rod set within a four-walled cell of the grid.

As shown in FIGS. 3 and 4, a pair of double deflected vanes 30 are positioned within each of the square cells such that the vanes 30 face each other and are deflected toward the fuel rod inside the square cell so as to generate swirl flow about the axis of the fuel rod 200 in a cell.

As described above, the present invention provides a spacer grid with a plurality of double deflected vanes for nuclear fuel assemblies, which generate a strong swirl flow around the fuel rod, preventing the vane from bending upon rod insertion and causing low pressure drop in the outlet of the spacer grid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid for a nuclear fuel assembly having a plurality of spacer grids which are regularly and transversely arranged along the nuclear fuel assembly to support a plurality of longitudinal fuel rods while maintaining a desired pitch of the fuel rods, comprising:

a plurality of first inner straps, each having a rectangular-shaped body and integrated at its upper edge with a plurality of double deflected vanes which are polygonal shaped, projecting upwardly, bent twice toward fuel rod in a cell, and capable of guiding an axial flow of coolant around the fuel rod thereby generating swirl flow, each of the first inner straps also having a plurality of vertical slits at positions between the double deflected vanes, said vertical slits extending from an upper edge of each first inner strap to the middle of said strap and being spaced at an interval equal to the pitch of the fuel rods; and a plurality of second inner straps, each having a rectangular-shaped body and integrated at its upper edge with a plurality of double deflected vanes which are polygonal shaped, projecting upwardly, bent twice toward fuel rod in a cell, and capable of guiding an axial flow of coolant around the fuel rod thereby generating swirl flow, each of the second inner straps also having a plurality of vertical slits at positions between the double deflected vanes, said vertical slits extending from the lower edge to the middle of said second inner strap and being spaced at an interval equal to the pitch of the fuel rods, whereby said first and second inner straps are interlaced at right angles at corresponding vertical slits, thereby forming a plurality of square cells capable of receiving the fuel rods, wherein each of said double deflected vanes comprises:

a swirl flow inducing vane having an inclined edge and an asymmetric triangular shape, said swirl flow inducing vane being integrated with the upper edge of an associated one of the first and second inner straps and being deflected in a direction toward an associated fuel rod at a first acute angle with respect to a plane of the associated inner strap; and a main vane integrally extending upward from the inclined edge of the swirl flow inducing vane and deflected in the direction toward the associated fuel rod at a second acute angle with respect to a plane of the swirl flow inducing vane, said main vane having a curved edge adjacent the associated fuel rod.

2. The spacer grid according to claim 1, wherein a pair of double deflected vanes disposed on either side of each of the vertical slits of the first and second inner straps are substantially rotationally symmetrical about a center line of the vertical slit.

3. The spacer grid according to claim 1, wherein a pair of double deflected vanes are positioned within each of the square cells, such that said pair of vanes face each other and are deflected toward the fuel rod inside the square cell so as to generate swirl flow about the axis of the fuel rod in the cell.

4. The spacer grid according to claim 1, wherein the second acute angle is larger than the first acute angle.

5. The spacer grid according to claim 1, wherein the width of lower portion of said swirl flow inducing vane is substantially equal to the distances between welding nuggets formed at each intersection of the first and second inner straps.

6. The spacer grid according to claim 1, wherein the curved edge maintains a constant distance from the surface of the associated fuel rod.

* * * * *

UNITED STATES PATENT AND TRADEMARK OFFICE
CERTIFICATE OF CORRECTION

PATENT NO. : 6,714,619 B2
DATED : March 30, 2004
INVENTOR(S) : Dongseok Oh et al.

It is certified that error appears in the above-identified patent and that said Letters Patent is hereby corrected as shown below:

<u>Title page,</u>
Item [73], Assignee, "Korea Kydro & Nuclear Power Co., Ltd." should be corrected to read -- Korea Hydro & Nuclear Power Co., Ltd. --.

Signed and Sealed this

Second Day of August, 2005

JON W. DUDAS
*Director of the United States Patent and Trademark Office*